(12) United States Patent
Brar et al.

(10) Patent No.: US 8,995,303 B1
(45) Date of Patent: Mar. 31, 2015

(54) COORDINATED ROUTING OF NETWORK TRAFFIC

(75) Inventors: Jagwinder Singh Brar, Bellevue, WA (US); Frederick David Sinn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 407 days.

(21) Appl. No.: 13/046,570

(22) Filed: Mar. 11, 2011

(51) Int. Cl.
*H04L 12/28* (2006.01)
*H04L 12/751* (2013.01)
*H04L 12/24* (2006.01)
*H04W 40/24* (2009.01)
*H04W 40/32* (2009.01)

(52) U.S. Cl.
CPC ............. *H04L 45/02* (2013.01); *H04L 41/082* (2013.01); *H04W 40/248* (2013.01); *H04L 41/12* (2013.01); *H04W 40/32* (2013.01); *H04W 40/246* (2013.01); *H04W 40/24* (2013.01)
USPC ............ 370/255; 370/254; 370/351; 370/389

(58) Field of Classification Search
None
See application file for complete search history.

(56) References Cited

U.S. PATENT DOCUMENTS

| | | | | |
|---|---|---|---|---|
| 5,883,812 | A * | 3/1999 | Fujii | 716/130 |
| 7,200,122 | B2 * | 4/2007 | Goringe et al. | 370/255 |
| 2003/0056138 | A1 * | 3/2003 | Ren | 714/4 |
| 2004/0039840 | A1 * | 2/2004 | Dispensa et al. | 709/242 |
| 2006/0168108 | A1 * | 7/2006 | Hake et al. | 709/218 |
| 2006/0193333 | A1 * | 8/2006 | Baughan et al. | 370/400 |
| 2007/0242607 | A1 * | 10/2007 | Sadler et al. | 370/238 |
| 2009/0180489 | A1 * | 7/2009 | Fujita et al. | 370/409 |
| 2009/0185508 | A1 * | 7/2009 | Duke et al. | 370/255 |
| 2011/0044269 | A1 * | 2/2011 | Fan et al. | 370/329 |
| 2011/0235550 | A1 * | 9/2011 | Adams et al. | 370/255 |
| 2012/0030150 | A1 * | 2/2012 | McAuley et al. | 706/12 |

* cited by examiner

*Primary Examiner* — Ayaz Sheikh
*Assistant Examiner* — Peter Chau
(74) *Attorney, Agent, or Firm* — Kilpatrick Townsend & Stockton LLP (57) ABSTRACT

Routing activities for a collection of routing devices in a network are coordinated. Link state information representative of connections among the devices is received from the devices. The received link state information is processed for each of the network devices. The processed link state information is provided to the network devices to enable the network devices to determine how to route network traffic. The processed link state information may represent the topology of the network differently to different devices in order to influence device routing behavior.

23 Claims, 7 Drawing Sheets

COORDINATED ROUTING OF NETWORK TRAFFIC

BACKGROUND

Many organizations operate computer networks as part of their operations. An organization may, for example, operate a data center in which multiple devices, such as servers, data stores, and other devices communicate with one another according to the needs of the organization. In order to enable communication among the various devices of a network, networks often include devices, such as routers, that are able to receive network traffic and forward the received traffic either to its intended destination or to another device along the way to the intended destination.

The topology of a network may vary over time. Devices in the network, for example, may become inoperable due to maintenance or failure. Devices may be added or removed from a network depending on changing needs. As a result, devices in the network are often updated in order to maintain the ability to route network traffic despite the network changes. Various conventional protocols may utilize algorithms that enable network devices to route traffic efficiently and effectively. Such algorithms may be used repeatedly to ensure that network devices are able to route network traffic according to a current state of the network. These conventional protocols, however, often require network devices to process large amounts of information about a network's topology, thereby consuming a substantial amount of computing resources as well as requiring network devices to be capable of the requisite processing.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of numbers is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for coordinating devices in a network. The network may be an interior network, such as an intranet, extranet, or other collection of devices forming an autonomous system. For instance, the devices may be devices corresponding to Internet Protocol (IP) addresses that are under the control of an organization, such as a collection of devices networked together in one or more data centers. The devices may include routing devices, such as routers, bridges, gateways, firewalls, switches, and/or general-purpose computers configured to route network traffic. Generally, the devices may be any devices that are operable to route network traffic according to the various embodiments of the present disclosure. The devices may operate according to a link state routing protocol, such as an open-shortest-path-first (OSPF) routing protocol, an intermediate-system-to-intermediate-system (IS-IS) routing protocol, or other routing protocol that utilizes information regarding the connectivity of the devices among themselves and other devices, such as servers or other devices in the network that receive network traffic.

In an embodiment, routing devices in a network are coordinated by at least one other device. The device may be referred to as a controller. The controller may receive information from the routing devices, process the information received from the routing devices, and provide the processed information to the routing devices to enable the routing devices to route network traffic accordingly. In at least one embodiment, for at least one of the routing devices, the controller processes at least a portion of the information received from the routing devices such that the routing device can use an algorithm to analyze the processed information and determine a way of routing network traffic that is different from a way of routing network traffic that the device would have determined had the routing device analyzed the information prior to being processed by the controller. The processed information may, for example, represent the topology of at least a portion of the network in a manner that is different than the network's actual topology. The processed information may, for example, summarize portions of the network, may indicate the absence of network links that are actually in the network, may indicate paths in the network that are not actually present in the network, and the like.

As an example, as noted, a routing device may analyze information representative of a topology of the network in which the routing device participates. The routing device may, in this example, analyze the network topology to determine a shortest path to each of a plurality of network elements. The shortest paths may be used to construct a routing table or other structure that enables the routing device to receive network traffic directed to a particular destination and, if possible, send the network traffic either directly to the particular destination or to another device according to a shortest path to the particular destination. In this example, a controller may process information about the network's topology (such as link state information) such that, when provided to the routing device, the routing device analyzes the processed information to determine, as a shortest path, a path to one or more network destinations that is not actually a shortest path. More generally, the controller may process the information about the network's topology such that, when provided to the routing device, the routing device processes the processed information to determine one or more shortest paths differently that the routing device would have had the controller not processed the information. The routing device, for example, may analyze the processed information such that, when possible, network traffic directed to one or more particular network destinations are routed according to particular shortest paths or, more generally, particular paths.

A controller may analyze information about a network's topology according to one or more policies. A policy may, for example, indicate that network traffic to one or more network destinations must be routed in a certain manner, such as through a network device that analyzes network traffic for security reasons. Another policy may, for example, indicate that network traffic from a particular source or collection of sources of network traffic should be routed in a particular manner. A routing device at the top of a rack of servers, for example, may generally route information through a particular router for most or all network destinations. Accordingly, for most destinations in the network, there may be no need for the routing device at the top of the rack to analyze and determine the shortest path for most network destinations because, for these destinations, the routing device at the top of the rack will always determine a shortest path that that includes the particular router. Therefore, in an embodiment, the controller may summarize these network destinations as a subnet or other subset of the network so that the routing device is able to treat the subnet or other subset as a single destination. In this manner, less computing resources are consumed because the routing device does not need to determine paths for each destination in the summarized portion of the network. In addition, because the routing device is required to perform less processing than with many conventional techniques, the routing device may be computationally less powerful than it would have to be otherwise, thereby allowing for the use of simpler and less expensive devices.

Techniques described and suggested herein, in various embodiments, also allow for the above and other advantages while at the same time making use of conventionally configured hardware. As noted above, one or more controllers may analyze information about a network's topology that has been received from various devices in the network. The analyzed information may then be sent to each of the routing devices in the network to enable the routing devices to efficiently determine how to route network traffic. In an embodiment, information from the routing devices to the controller and/or information from the controller to the routing devices may be exchanged according to existing protocols, such as OSPF and IS-IS. Routing devices configured to operate according to an OSPF routing protocol, for example, may be instructed to not share their link state databases with their neighbors in the network, but only to the controller. After processing the link state databases from each of the routing devices, the controller may then utilize the OSPF protocol to send specially configured link state databases to enable the routing devices to analyze the specifically configured link state databases to determine how to route network traffic.

Figure 1:
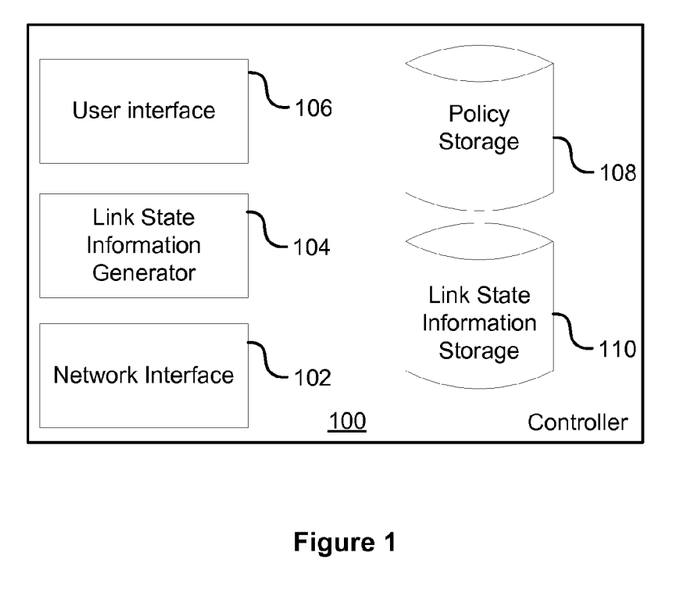
FIG. 1 is a schematic diagram illustrating an example of a device for coordinating a plurality of routing devices in accordance with at least one embodiment.

FIG. 1 provides an illustrative example of a controller that may be used to implement various aspects of the present disclosure. The controller shown in FIG. 1, in an embodiment, is generally operable to receive information from various network elements and to provide information to the network elements. A network element may be one or more devices in the network and may include devices that are able to route network traffic, such as routers and other devices noted above. As will be described in more detail, the controller 100 shown in FIG. 1, in an embodiment, is configured to receive link state information from a plurality of network elements. As an example, the controller may be configured to receive link state databases from a plurality of devices that operate according to an OSPF protocol or other protocol that utilizes link state databases.

A link state database for a device may be a collection of information that indicates one or more other devices with which the device may directly communicate. For instance, if a first router is connected with a second router, a link state database for the first router may indicate that the first router is connected with the second router. Likewise, a link state database for the second router may indicate that the second router is connected with the first router. However, if a third router is directly connected with the second router but not the first router, the link state database for the first router may not indicate a connection with the third router but a link state database of the second router (and a link state for the third router) may indicate the connection between the second router and the third router. Thus, while the link state databases for the first router, second router, and third router each do not individually indicate that the first router is indirectly connected with the third router (through the second router), the link state databases for the first router, second router, and the third router collectively indicate that the first router is indirectly connected with the third router. Therefore, more generally, in an embodiment, while each link state database received by the controller may not individually indicate a complete topology of the network, the link state databases of the controller may collectively indicate the network's topology.

In an embodiment, the controller processes the received link state information and provides link state information to the network elements. The link state information provided to each of the network elements may vary among the network elements. In this manner, various routing protocols may be used more efficiently than currently in conventional techniques, thereby providing for the conservation of computing resources such as memory, processing resources and other computing resources. In order to accomplish the processing and distribution of link state information, as shown in FIG. 1, the controller 100 may include a plurality of functional components and a plurality of storage components. For example, in an embodiment, the controller includes a network interface 102 that enables the controller to communicate with various network elements in a network. The network interface 102 may be used for example, to receive link state information network elements and to provide link state information to those elements. The network interface may utilize an interior gateway protocol, such as OSPF or IS-IS, when communicating with other devices in the network.

In an embodiment, the controller 100 includes a link state information generator 104. The link state information generator 104 may be a component of the controller that is operable to analyze link state information received from various network elements and to generate link state information to be provided to the network elements. Generally, as will be described in more detail below, the link state information generator 104 is operable to process link state information to be provided to network elements such that one or more of the network elements may process the received link state information to route network traffic in a manner different than it would utilizing conventional techniques. The link state information generator 104 may also incorporate a policy engine to apply one or more policies when processing link state information.

In an embodiment, controller 100 also includes a user interface 106. The user interface 106 may be an interface that allows users to operate the controller 100. The user interface 106 may be used for example, to enable a user to provide policy information to the controller 100 to monitor activities of the controller 100 and generally to communicate with the controller 100 in any manner that may be useful.

As mentioned, the controller 100 in an embodiment includes various storage components. For example, in an embodiment a controller 100 includes a policy storage component 108. The policy storage component 108, in an embodiment includes memory allocated for the storage of policy information. Policy information for a policy may indicate a set of one or more conditions for routing network traffic that correspond to the policy. In other words, a policy may include one or more rules for routing certain network traffic, such as network traffic addressed to a particular destination or set of destinations, network traffic originating from a particular destination or set of destinations, and/or generally network traffic having one or more particular characteristics. As one example, policy information may indicate that traffic from one network element to another network element should be routed in a particular manner. As another example, policy information may indicate that network traffic originating from an area in a network should be routed in a particular manner. Policy information may hierarchically categorize network elements and specify that network traffic received by one or more network elements should be handled in a specific manner that depends on the one or more network elements' location in the hierarchy. A policy may, for example, specify, for example, that routers at the top of server racks should, as a default, router network traffic from their respective racks upward in the hierarchy. Generally, the policy information may indicate any condition for routing network traffic.

In an embodiment, the controller 100 includes link state information storage 110. As noted above, the controller 100 may receive link state information, such as link state databases, from various network components. Upon receipt of link state information from a network element, the controller 100 may store the received link state information in memory allocated to the link state information storage. Information in the link state storage component 110 may include for example, information about the network connection between various network elements. If, for example, a router is connected with three other routers, the link state information may indicate such in the link state information storage component 110.

Information in the link state information storage 110 may be stored in various ways. In at least one embodiment, the link state information is stored in a manner in which the information is received. Link state information received from a network element, for example, may be stored in a manner that associates the received link state information with the network element. Link state information may also be compiled for storage in the link state information storage 110. Upon receipt of link state information from a network element, for example, information representative of the network topology may be updated according to the received link state information. The information representative of the network topology may be updated as link state information is received from various network elements. Generally, link state information may be stored by the controller in any suitable manner which may vary among the various embodiments.

It should be noted that FIG. 1 illustrates a particular example of a controller for the purpose of illustration. However, variations of the controller are considered as being within the scope of the present disclosure. As one example, FIG. 1 shows various components of the controller as being part of a single device. However, the controller may be a computing system comprising multiple components that are implemented with other devices. The policy storage 108 and/or link state information storage 110, for example, may be implemented using storage devices that are separate from one or more other devices that implement the user interface 106, the link state information generator 104, and/or the network interface 102. In addition, the controller 100 may include additional components than illustrated. Further, multiple components of the controller may be implemented as a single component that performs the functions of the components, as described above, or variations thereof.

Figure 2:
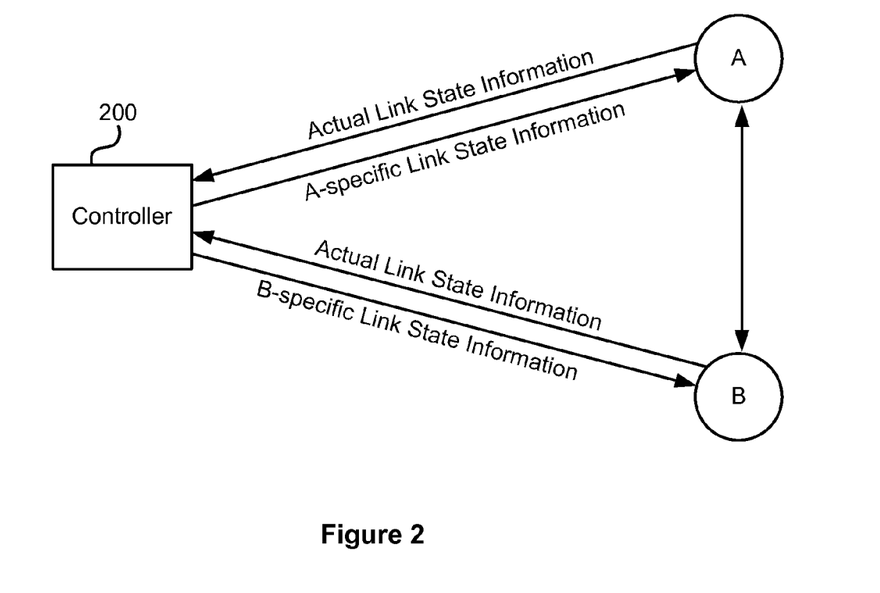
FIG. 2 is a schematic diagram illustrating operation of a device for coordinating a plurality of routing devices, such as the device illustrated and described in connection with FIG. 1, in accordance with at least one embodiment.

FIG. 2 shows a diagram that illustrates how the controller may interact with various network elements. On this particular example, FIG. 2 shows a controller 200 that communicates with a network element labeled "A" and a network element labeled "B." The controller 200 may be the controller 100 described above in connection with FIG. 1, or, generally, any device or collection of devices configured to perform the functions described herein. It should be noted that the configuration illustrated in FIG. 2 is for the purpose of illustration and typically, networks are widely varied in the number of network elements in a manner by which the network elements are connected with one another. As just one example, FIG. 2 shows one controller 200. However, in various embodiments, two or more controllers are utilized for the purpose of redundancy should one or more controllers fail and/or to distribute the need for computing resources among multiple devices. As another example, FIG. 2 illustrates the controller 200 being directly connected with network elements. One or more network elements may, however, not be directly connected with the controller 200, but may be indirectly connected with the controller 200 through intermediate devices.

In an embodiment, the network elements illustrated in FIG. 2 are configured to provide actual link state information to the controller 200. In an embodiment, each network element provides information identifying one or more other devices that are directly connected with the network element. Each network element may provide, for example, a link state database to the controller 200. Thus, if the network element labeled "A" is connected with a plurality of other network elements, the connections between those network elements and the network elements labeled "A" are information indicating the connections between the network element labeled "A" and the other network elements are provided to the controller 200. For example, as shown in FIG. 2, network element A in this example is connected with a network element labeled "B" and, therefore, the actual link state information for both network element A and network element B would indicate this connection. Specifically, in an embodiment, the actual link state information for network element B would indicate a connection with network element B and actual link state information for network element B would indicate a connection with network element A. In one embodiment, the actual link state information is a link state database configured according to an interior gateway protocol, such as OSPF or IS-IS. However, generally, the actual link state information may be any information that indicates how network elements are connected among themselves.

As shown in FIG. 2, the controller 200 provides link state information to each of the network elements. The link state information provided to the network elements may be in the form of a link state database configured in accordance with an interior gateway protocol, such as OSPF or IS-IS. As with the actual link state information, the link state information provided to the network elements may be in any suitable form. The link state information provided by the controller 200 to each of the network elements my differ among the network elements. For instance, the controller 200 may send link state information to network element A that is specific to network element A. Similarly, the controller 200 may provide link state information to network element B that is specific to network element B. However, one or more network elements may receive identical link state information from the controller in various embodiments. In other words, link state information provided from the controller to network element A may be different from the link state information provided to network element B. The link state information provided to any of the network elements may represent a topology of the network that is different from the network's actual topology. For instance, as discussed above, the link state information provided to a network element may summarize a portion of the network as a sub-network (subnet), may lack links that are present in the actual network topology, may include links that are absent from the actual network topology, and the like.

In an embodiment, each of the network elements A and B are operable to process the link state information received from the controller 200 in order to determine how the network element should route network traffic. Each of the network elements A and B for example, may utilize a Dijkstra algorithm in order to form a shortest path tree from the link state information received from the controller and then form a routing table from the shortest path tree. It should be noted that, while examples of the present disclosure refer to Dijkstra algorithms, other algorithms may be used in processes for determining how to route network traffic in various embodiments, such as other graph search algorithms. Example algorithms that may be used in various embodiments include Bellman-Ford algorithms, A* algorithms, and Prim's algorithm. Generally, any algorithm that may be used to determine how to route network traffic may be used. For example, any algorithms that may be used to identify one or more paths between two nodes in a graph may be used. Returning to the present example, as noted, because any of the network elements may receive link state information from the controller that represents a network topology that is different from the network's actual topology, any of the network elements may determine shortest path trees that include one or more paths that are not actual shortest paths. However, all shortest paths of a shortest path tree determined by a network element may be actual shortest paths, depending on how the controller 200 processed the actual link state information.

Figure 3:
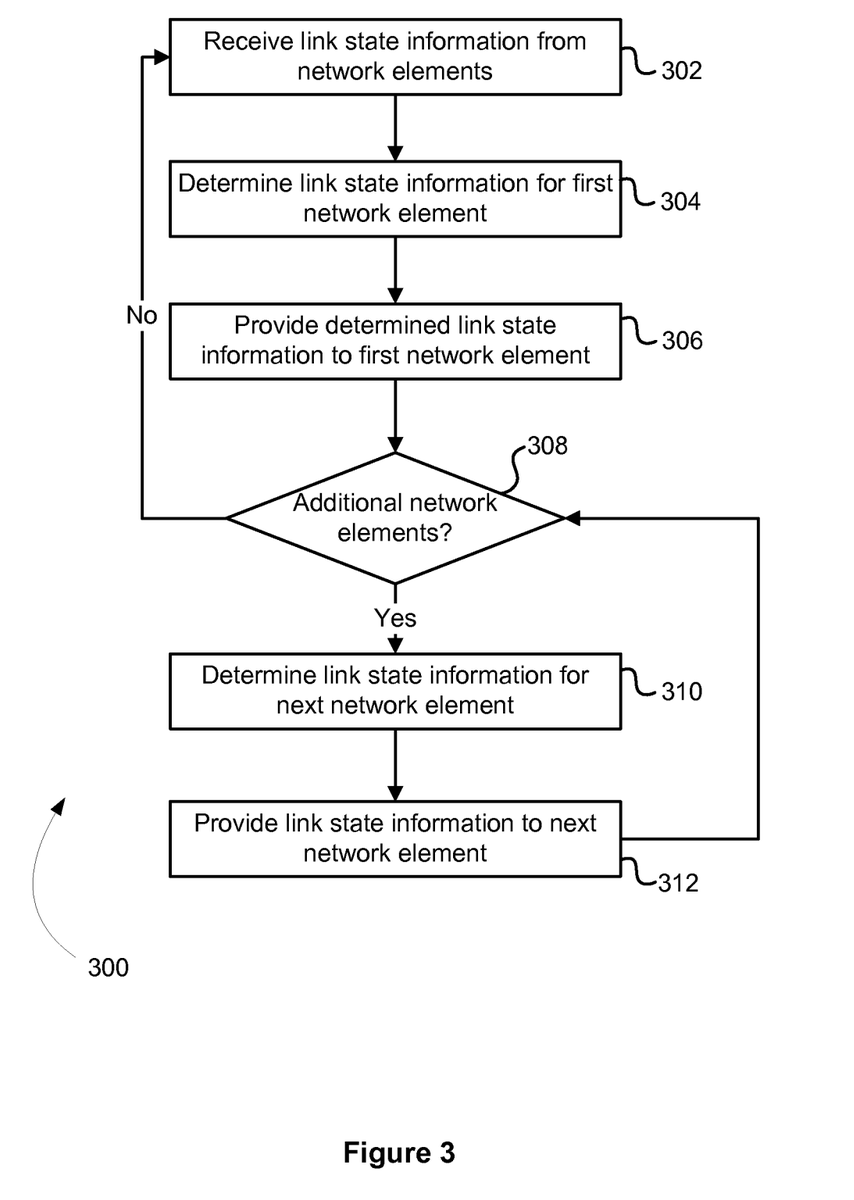
FIG. 3 is a flowchart depicting example actions that may be taken in a process for coordinating a plurality of routing devices in accordance with at least one embodiment.

FIG. 3 provides an illustrative example of a process 300 that may be used to implement various embodiments of the present disclosure. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 300 includes receiving 302 link state information from network elements. The network elements for example, may be configured to provide link state information to a controller such as controller described above in connection with FIG. 1 at regulator points in time or in response to requests for such information from a controller. The link state information may be link state databases of the network elements. Generally, any manner of receiving link state information from network elements may be used.

In an embodiment, when link state information is received, the process 300 includes determining 304 link state information for a first network element. Determining the link state information for the first network element may be accomplished, for example, by analyzing the received linked state information according to one or more policies applicable to the first network element. Link state information applicable to the first network element may be determined accordingly and, in an embodiment, the determined link state information is provided 306 to the first network element. The determined link state information may, for example, be sent over the network to the first network element. Depending on the analysis performed on the received link state information, the determined link state information may reflect the network's topology different than the network's actual topology.

In an embodiment, the process 300 includes determining 308 whether there are additional network elements for which link state information should be determined and/or provided. If there are additional network elements, which may be typical for networks having multiple network elements, link state information for the next network element is determined 310. As with the first network element, determining the link state information for the next network element may be performed in any suitable manner, such as by generating link state information according to one or more policies that apply to the next network element. As above, when the link state information to the next network element has been determined 310, then link state information is provided 312 to the next network element, such as in a manner described above.

In an embodiment, determination is again made 308 whether there are additional network elements for which link state information should be determined and/or provided. And as shown in the figure, if there are additional network elements, then corresponding link state information is determined and provided. However, if at some point there is a determination made 308 that there are not additional network elements, then the process 300 may include receiving link state information from the network elements again. The process 300 may for example, receive link state information at various intervals. One or more of the network elements may, for example, be configured to periodically send link state information.

It should be noted that the process 300 and other process use described herein are provided for the purpose of illustration and that variations are considered as being within the scope of the present disclosure. For example, FIG. 3 shows various actions taken as discrete steps. However, the actions taken may be performed in an order that is different than that which is illustrated. As just one example, link state information may be determined for each of the network elements before providing the determined link state information to the network elements. Similarly, various network elements are configured to provide link state information at different times. Thus, a computing device implementing a process 300 or a variation thereof, may receive link state information from different network elements at different times. Of course, other variation are considered as being within the scope of the present disclosure.

Figure 4:
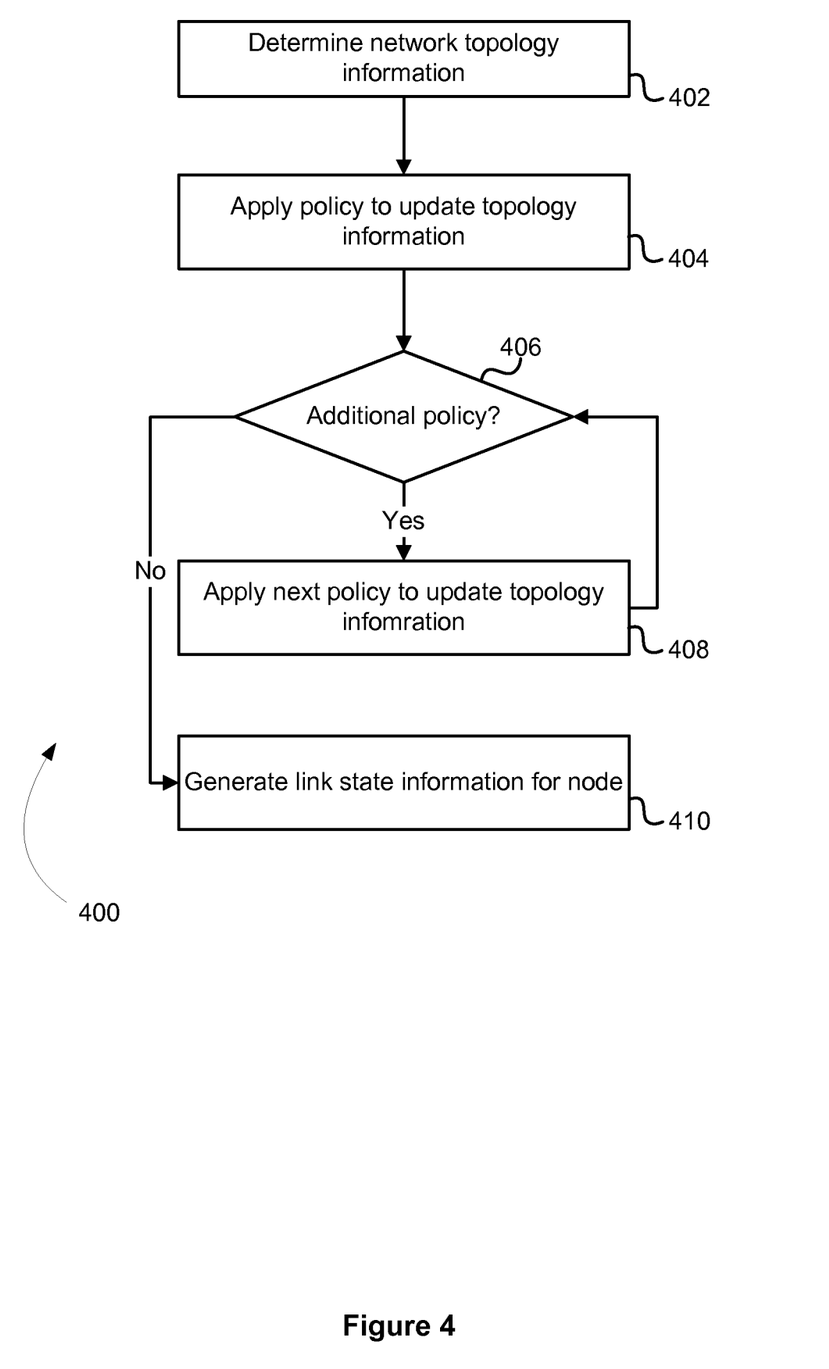
FIG. 4 is a flowchart depicting example actions that may be taken in a process for applying one or more policies to receive link state information in accordance with at least one embodiment.

FIG. 4 illustrates a process for generating link state information to be forwarded to a network element in accordance with an embodiment. In an embodiment, the process 400 may, for example, be utilized in connection with the process 300 described above in FIG. 3 in order to determine link state information for a network element. In an embodiment, a process 400 illustrated in FIG. 4 includes determining 402 network topology information from link state information received from a plurality of network elements. A controller such as described above, for example, or other device may compile received link state information and perform a Dijkstra-based algorithm on the information in order to generate a shortest path tree for a network element. In general, however, network topology information may be determined in any way depending on various implementations possible within the scope of the present disclosure. Using the example of a shortest path tree, the shortest path tree may be rooted at a network element for which the process 400 is being performed.

In an embodiment, the process 400 includes applying 404 an applicable policy to update the topology information. Applying a policy to the topology information may be performed in any suitable manner, examples of which are provided below. Briefly, updating a topology information may include changing a network topology information in a manner that complies with a policy. Using the example of a shortest path tree, the shortest path tree may be modified according to the policy. A policy may, as an example, indicate that a particular set of network elements should route traffic in a specific manner such as through a particular network element. In this manner updating the topology information may include replacing the particular network elements with a subnet in the network topology information.

In an embodiment, a determination is made 406 whether there are any additional applicable policies. If there are additional policies, then the next policy is applied 408 to the updated topology information in order to update the updated topology information. With the topology information once again updated, in an embodiment, a determination is once again made 406 whether there are additional applicable policies. If there are applicable policies, then those policies are applied such as in a manner illustrated in FIG. 4. If, however, a determination is made 406 that there are no additional policies then link state information is generated for the network element for which the process 400 is being performed. Continuing the example with summarizing a set of network elements by replacing the set of network elements with a subnet, the link state information may indicate a subnet instead of the individual network elements of the subnet in order that the network element for which the process 400 is being performed does not need to process to determine its shortest path for each of the network elements of the subnet.

As with all processes described herein, variations of the process 400 are considered as being within the scope of the present disclosure. For instance, applicable policies may be combined prior to updating link state information, rather than updating the link state information for each policy. In addition, while various examples are illustrated using shortest path trees that have been determined from received link state information, other structures representative of a network's topology may also be used. For instance, in at least one embodiment, the link state information is encoded as a graph having nodes representing network elements and edges representing communication links between the network elements. Updating the link state information may involve modifying the graph according to one or more policies, such as by replacing a set of nodes with another set of nodes, such as a single node representing a subnet. Other ways of updating the graph may include adding edges, removing edges, changing weight values assigned to the edges, and the like.

Figure 5:
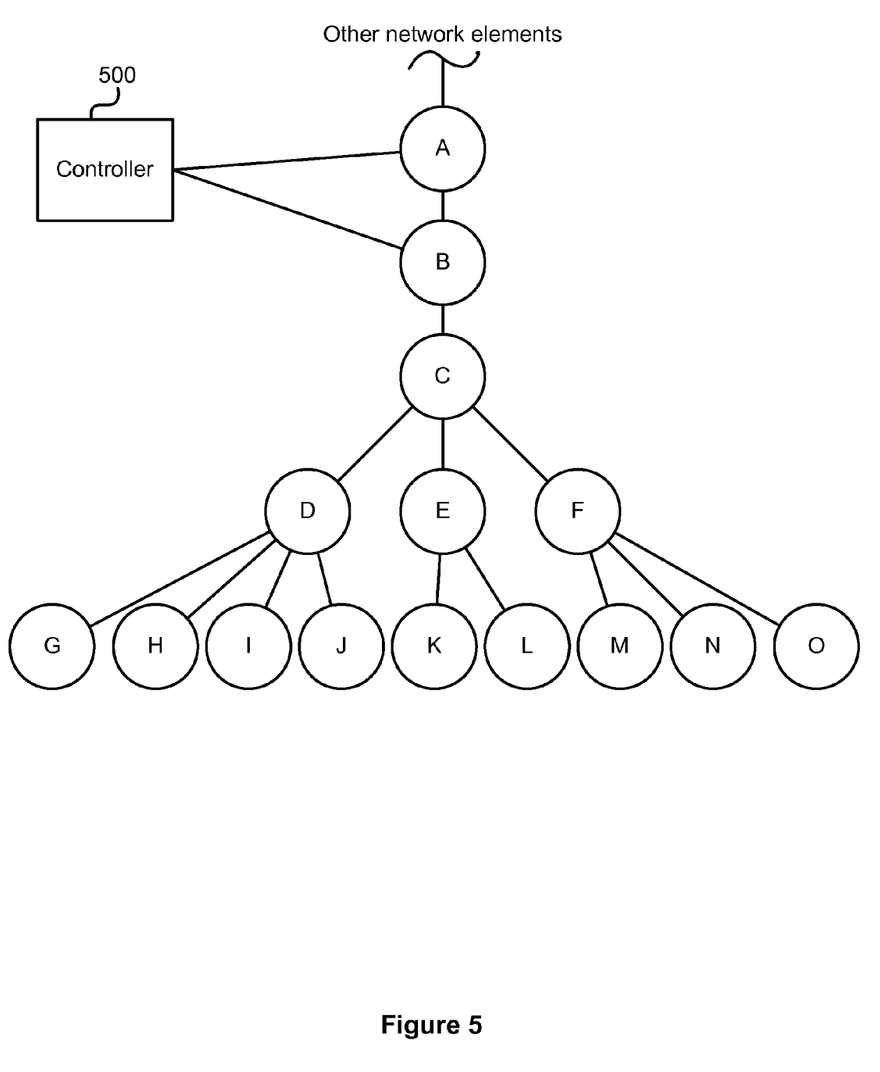
FIG. 5 is a schematic diagram illustrating an example network that includes a device for coordinating a plurality of routing devices, such as the device illustrated and described in connection with FIG. 1, in accordance with at least one embodiment.

FIG. 5 shows an illustrated example of a network topology of at least a portion of a network. The network topology of FIG. 5 is shown as a graph having nodes representing network elements and edges representing communication links between the network elements. It should be noted that the network topology provided in FIG. 5 is provided for the purpose of illustration and generally network topologies may be different from the illustrated topology and, in many instances, more complex than as is illustrated. In FIG. 5, a plurality of network elements are shown as circles labeled with a letter of the alphabet. For example, as shown in FIG. 5, a controller 500 communicates with a network element A and a network element B. The controller 500 may also communicate with other network elements directly or indirectly. The controller may be a controller described above, or a variation thereof.

In this particular example shown in FIG. 5, the topology as illustrated includes network elements labeled with letters of the alphabet from A to O. For example, network element A is connected to network element B and also other network elements which are not shown in the figure. Network element B is connected with network element A and network element C. Network element C is connected with network element B and network elements D, E and F. Network elements D, E and F are each connected with a plurality of network elements as shown in the figure. In the illustrative example of FIG. 5, network elements connected together with a line may be directly communicatively connected with one another. A data cable may, for example, connect devices shown as connected together in the figure. It should be noted, however, that edges in the graph illustrated in FIG. 5 may represent other types of communication links, such as wireless network connections.

Figure 6:
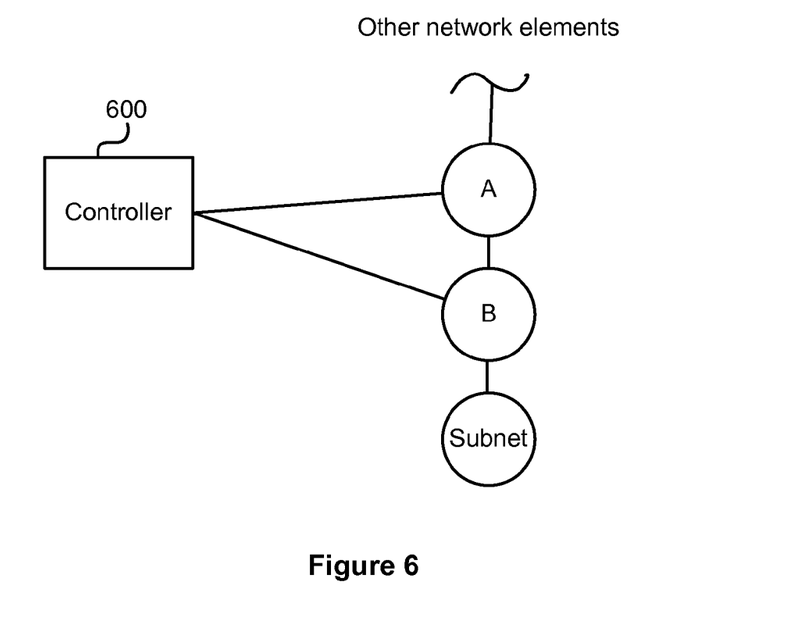
FIG. 6 is a schematic diagram illustrating a network, such as the network depicted and described in connection with FIG. 5, as the network topology is presented to a network element of the network in accordance with at least one embodiment.

FIG. 6 shows an illustrated example of a network topology which may be the topology shown in FIG. 5 after a policy has been applied to corresponding topology information and link state information has been generated accordingly. The network topology illustrated in FIG. 6 may be, for example, a topology represented by link state information generated for network element A and/or network element B, shown in the figure. In other words, the network topology illustrated in FIG. 6 may represent a topology of the network of FIG. 5 as provided to a network element to enable the network element to process a routing table or otherwise determine how to route received network traffic. For the purpose of this illustration, it will be assumed that information corresponding to the topology represented in FIG. 6 was generated for network element A.

FIG. 6, as with FIG. 5, shows a controller 600 which may be a controller described above, or a variation thereof. The controller 600 may have applied a policy to the topology shown in FIG. 5 to generate information representing the network topology illustrated in FIG. 6. The policy may, for example, indicate that network traffic originating from any of the network elements D, E, F, G, H, I, J, K, L, M, N and O should, as a default, be routed network traffic through network element C when possible. Therefore, with the network topology being as it is illustrated in FIG. 5, it may be unnecessary for the network element A to compute paths for network traffic to all of the nodes D, E, F, G, H, I, J, K, L, M, N and O because it is sufficient to just route network traffic directed to a subnet to the network element C. Therefore, in an embodiment, link state information for the network element A is generated to indicate a topology illustrated in FIG. 6 such that the network elements D, E, F, G, H, I, J, K, L, M, N and O are replaced with a subnet. In this manner, network element A may compute a shortest path to the subnet instead of calculating a shortest path for each of the network elements in the subnet. Thus, in contrast to conventional techniques, the network element A does not need to complete a shortest path for each of the network elements C, D, E, F, G, H, I, J, K, L, M, N and O. Instead, network element A simply computes a shortest path to the subnet which, as illustrated, indicates that network element A would route all received network traffic to an element of the subnet to network element B. As a result, network element A required less computing resources in order to determine how to properly route network traffic than would have been required had network element A been required to process all of the information illustrated in FIG. 5.

Figure 7:
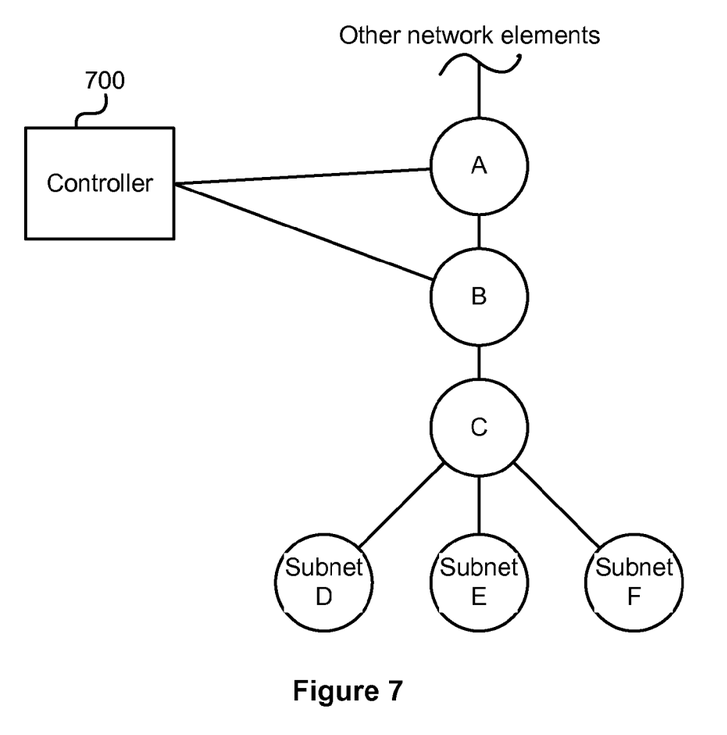
FIG. 7 is a schematic diagram illustrating a network, such as the network depicted and described in connection with FIG. 5, as the network topology is presented to a network element of the network in accordance with at least one embodiment.

As noted above, link state information that is generated by a device such as a controller may generate different link state information for each of a plurality of different network elements. FIG. 7 for example, illustrates a topology according to link state information that may be provided to the network element C. As with FIGS. 5 and 6, FIG. 7 shows a controller 700 communicating with network elements A and B although the controller 700 may communicate with other network elements as well. As shown in FIG. 5, network elements G, H, I, J, K, L, M, N, and O each route information to a router that aggregates information from those network elements. For example, network elements G, H, I, J are aggregated by network element D. Similarly, the network elements K and L are aggregated by network element E. Network elements M, N and O are aggregated by network element F. Thus, if the network element C is to route network traffic according to a shortest path to one of the network elements G, H, I, J, K, L, M, N, 0 it is only necessary that the network element C routes traffic directed to any of the network elements G, H, I, J, K, L, M, N and O to an appropriate network element D, E or F.

For example, using the topology illustrated in FIG. 5, network element C would not, under normal conditions (such as when a network connection between network element C and E exist), route traffic directed to network element K by sending the traffic to network element B instead of network element E. It would whenever possible, route such traffic through network element E. Thus, in this example, it is unnecessary for network element C to determine shortest paths to each of the network elements K and L, because the shortest path for each of these elements would proceed through network element E. Similarly, it is unnecessary for network element C to determine shortest paths to network elements G, H, I, and J, because the shortest path in this example would be through network element D.

Accordingly, after one or more policies applicable to the network element C are applied to the network topology represented by FIG. 5, the link state information may be generated for the network element C accordingly. The result is shown in FIG. 7, where network elements D, G, H, I and J are represented by a Subnet D, network elements K and L are represented by Subnet E and network elements F, M, N, and O are represented by Subnet F. In this manner, as with FIG. 6, the network element C does not need to calculate shortest path to each of the network elements G, H, I, J, K, L, M, N and O, but merely the shortest path to Subnet D, Subnet E, and Subnet F.

As discussed above, various embodiments of the present disclosure are useful for summarizing collections of network elements in order to reduce the amount of processing needed to be performed by each of the network elements in a network. However, other actions may be taken in accordance with various embodiments. For instance, in some instances it may be desirable that network traffic between search and network elements and/or subnets pass through a particular network element which may be, for example, a security device that analyzes the traffic and takes actions according to one or more policies on the traffic. Thus, embodiments of the present disclosure include generating link state information for a network element in a manner that causes the network elements to compute a shortest path that is not actually the shortest path of the network.

Figure 8:
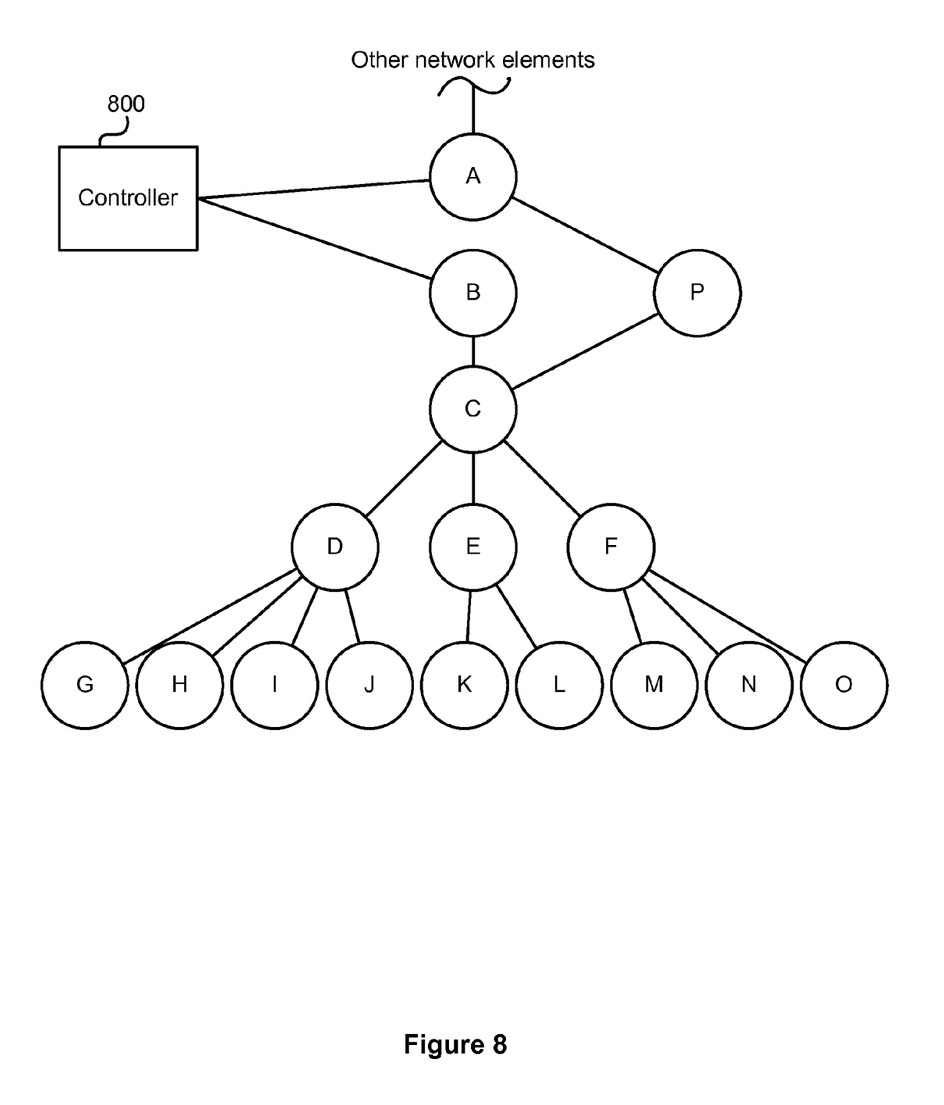
FIG. 8 is a schematic diagram illustrating a network, such as a variation of the network depicted and described in connection with FIG. 5, as the network topology is presented to a network element of the network in accordance with at least one embodiment.

FIG. 8 for example, illustrates a network topology that may be represented by information provided by a controller to network element A of FIG. 5. The network represented in FIG. 8, as shown, also includes an additional network element P, which was not illustrated in FIG. 5. Also, as with FIG. 5, FIG. 8 illustrates a network topology that includes a controller 800. The network topology represented in FIG. 8 may be the result of the controller 800 applying a policy to information representing the network shown in FIG. 5 (with the addition of network element P). This policy may, for example, indicate that, as a default, network traffic flowing from A to B should pass through network element P when possible. Without application of this policy, the network element A may compute the shortest path to element B as being a direct path to element B. In other words, if network element A receives traffic destined for network element B, network element A may send such traffic directly to element B according to conventional routing techniques. However, by indicating to network element A that there is no link between network element A and network element B, network element A may then compute the shortest path to network element B as being a path that proceeds from network element A to network element P, from network element P to network element C, and from network element C to network element B. Thus, if network element A processes a routing table based on information corresponding to the network topology illustrated in FIG. 8, network element A would, when possible, construct the table such that, when possible, network traffic received by network element A, but directed to network element B, would be sent to network element P, even though a direct connection to network element B exists.

Of course, as discussed above, other actions may be taken when generating link state information for a network element. For example, looking at FIG. 8, in addition to the link state information changed with regard to network elements A and B, other sets of network elements may be summarized to subnet such as in a manner described above. For example, network element A, in addition to routing certain traffic through network element P, would also not be required to compute a shortest path for traffic directed to, as an example, network elements G, H, I, J, K, L, M, N and O. Generally, information provided by a controller to one or more network elements may represent the network having a topology that is different from the network's actual topology, thereby causing network elements to determine a manner of routing network traffic differently than they would have had they analyzed information representing the actual network topology.

Figure 9:
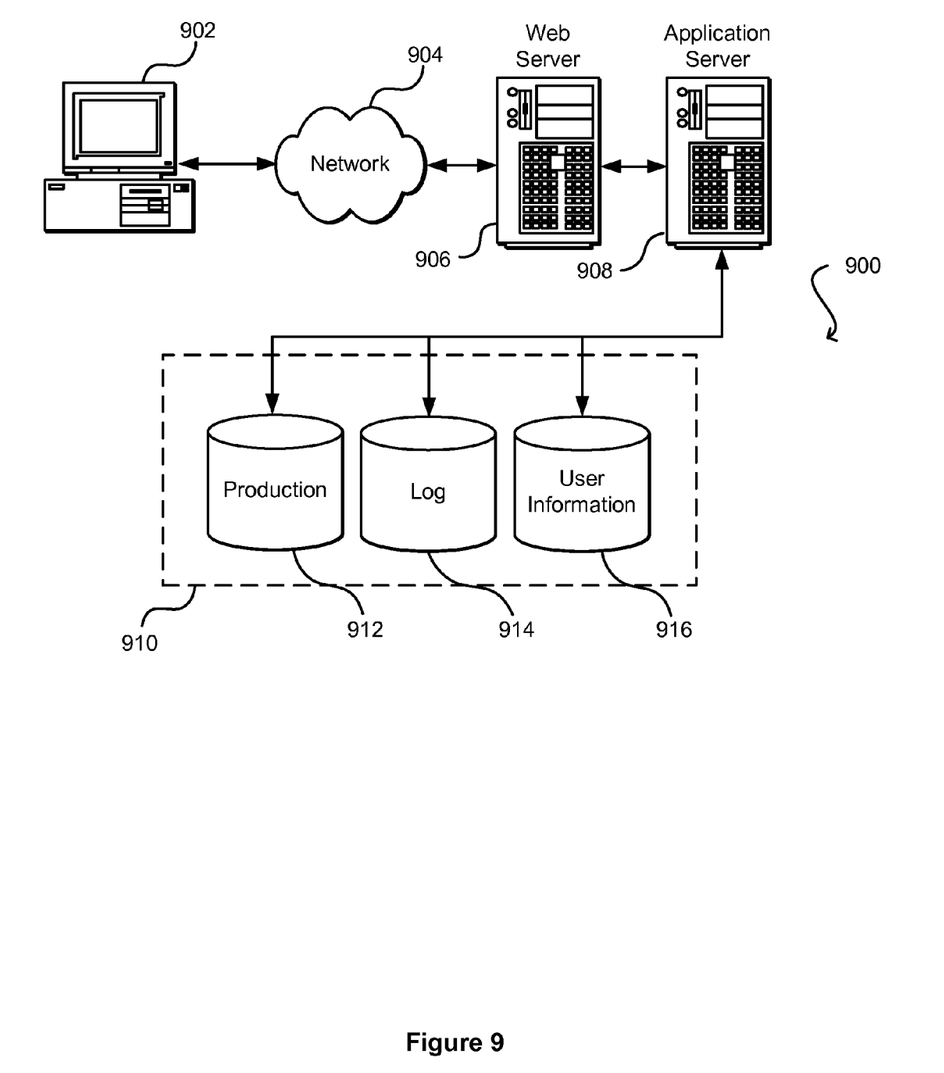
FIG. 9 illustrates an environment in which various embodiments can be implemented.

FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for routing information in a network, comprising:
   receiving, by a computer system, link state information from a plurality of network elements at various intervals, at least one network element of the plurality of network elements configured to send a portion of the link state information according to an interval of the various intervals, the received link state information being processed according to a link state algorithm into first routing information for the at least one network element of the plurality of network elements, the first routing information used by the at least one network element of the plurality of network elements to route network traffic received by the at least one network element, the at least one network element being configured to apply the link state algorithm;

accessing, by the computer system, one or more policies that indicate a hierarchical categorization of the plurality of network elements, wherein a location of the at least one network element within the hierarchical categorization determines how to route the network traffic received by the at least one network element;

changing, by the computer system and based at least in part on the accessed one or more policies, the received link state information such that the changed link state information is processed according to the link state algorithm into second routing information that is different from the first routing information, the changed link state information identifying at least one subnet element replacing the at least one network element that is identified in the received link state information; and providing the changed link state information to the at least one network element such that the at least one network element determines, by applying the link state algorithm to the changed link state information, second routing information to route the received network traffic.

2. The computer-implemented method of claim 1, wherein the link state algorithm is based at least in part on an open-shortest-path-first protocol.

3. The computer-implemented method of claim 1, wherein the link state algorithm is based at least in part on an intermediate-system-to-intermediate-system protocol.

4. The computer-implemented method of claim 1, wherein the network is at least a portion of an autonomous system.

5. The computer-implemented method of claim 1, wherein receiving the link state information includes receiving a link state database from one or more of the plurality of network elements.

6. A computer-implemented method for routing information in a network, comprising:

receiving, by a computer system, network topology information from a plurality of network elements at various intervals, at least one network element of the plurality of network elements configured to send a portion of the network topology information according to an interval of the various intervals, the received network topology information collectively representing a network topology that is processed by a route processing algorithm of an interior gateway protocol into first routing information for the at least one network element that is configured to perform the route processing algorithm;

accessing, by the computer system, one or more policies that indicate a hierarchical categorization of the plurality of network elements, wherein a location of a network element of the plurality of network elements within the hierarchical categorization determines how to route network traffic received by the network element;

changing, by the computer system and based on the accessed one or more policies, the received network topology information such that the changed network topology information is processed by the route processing algorithm into second routing information, that is different from the first routing information, the changed network topology information identifying at least one subnet element replacing the at least one network element that is identified in the received network topology information; and providing the changed network topology information to the at least one network element such that the at least one network element determines, by at least applying the route processing algorithm to the changed network topology information, the second routing information to route received network traffic.

7. The computer-implemented method of claim 6, wherein the route processing algorithm is based at least in part on a link state routing protocol.

8. The computer-implemented method of claim 6, wherein the at least one network element is a router.

9. The computer-implemented method of claim 6, wherein the network is at least a portion of an autonomous system.

10. A computer-implemented method for routing information in a network, comprising:

receiving, by a computer system, link state information from a plurality of network elements at various intervals, at least one network element of the plurality of network elements configured to send a portion of the link state information according to an interval of the various intervals, the plurality of network elements each configured to route network traffic according to a link state routing protocol, the received link state information being processed into first routing information for the at least one network element of the plurality of network elements; and for each network element of at least a subset of the plurality of network elements:

accessing, by the computer system, one or more policies that indicate a hierarchical categorization of the plurality of network elements, wherein a location of the network element within the hierarchical categorization determines how to route network traffic received by the network element;

changing, by the computer system and based on the accessed one or more policies, the received link state information such that the changed link state information is for the network element, the changed link state information identifying at least one subnet element replacing the at least one network element that is identified in the received link state information and the changed link state information configured for processing by the network element according to the link state routing protocol to determine how to route the received network traffic; and using the link state routing protocol to distribute the changed link state information to the network element such that the network element determines, by applying the link state routing protocol to the changed link state information, second routing information to route the received network traffic.

11. The computer-implemented method of claim 10, wherein the link state routing protocol is an open-shortest-path-first routing protocol.

12. The computer-implemented method of claim 10, wherein the link state routing protocol is an intermediate-system-to-intermediate-system routing protocol.

13. The computer-implemented method of claim 10, wherein the received link state information is processable by an algorithm of the link state routing protocol to determine the first routing information and wherein the second routing information is different from the first routing information.

14. The computer-implemented method of claim 10, wherein determining how to route the received network traffic includes applying a Dijkstra algorithm to the changed link state information.

15. A system for coordinating a plurality of routing devices in a network, comprising:
one or more processors; and
memory including instructions executable by the one or more processors that, when executed by the one or more processors, cause the system to at least:
receive network topology information from each of a plurality of network elements at various intervals, at least one network element of the plurality of network elements configured to send a portion of the network topology information according to an interval of the various intervals, the received network topology information collectively representing a first network topology that is processed by a route processing algorithm of an interior gateway protocol into first routing information for the at least one network element that is configured to perform the route processing algorithm; and
for the at least one network element:
access one or more policies that indicate a hierarchical categorization of the plurality of network elements, wherein a location of the at least one network element of the plurality of network elements within the hierarchical categorization determines how to route network traffic received by the at least one network element;
change, based at least in part on the accessed one or more policies, the received network topology information such that the changed network topology information represents a second network topology that is different from the first network topology, the second network topology identifying at least one subnet element replacing the at least one network element that is identified in the first network topology; and
provide the changed network topology information to the at least one network element such that the at least one network element determines, by applying the route processing algorithm to the changed network topology information, how to route the received network traffic according to the second network topology.

16. The system of claim 15, wherein the at least one network element is configured to process the changed network topology information according to a link state protocol.

17. The system of claim 15, wherein the at least one network element is a router.

18. The system of claim 15, wherein the network is at least a portion of an autonomous system.

19. A non-transitory computer-readable storage medium having stored thereon instructions that, when executed by one or more processors of a computer system, cause the computer system to at least:
receive link state information from a plurality of network elements at various intervals, at least one network element of the plurality of network elements configured to send a portion of the link state information according to an interval of the various intervals, the plurality of network elements each configured to route network traffic according to a link state routing protocol, the received link state information being processed into first routing information for the at least one network element of the plurality of network elements; and
for each network element of at least a subset of the plurality network elements:
access one or more policies that indicate a hierarchical categorization of the plurality of network elements, wherein a location of the network element in the hierarchical categorization determines how to route network traffic received by the network element;
change, based at least in part on the accessed one or more policies, the received link state information such that the changed link state information is processed according to the link state routing protocol into second routing information for the network element, the changed link state information identifying at least one subnet element replacing the at least one network element that is identified in the received link state information the changed link state information is processed by the network element according to the link state routing protocol to determine how to route the received network traffic; and
use the link state routing protocol to distribute the changed link state information to the network element such that the network element determines, by applying the link state routing protocol to the changed link state information, a second routing information to route the received network traffic.

20. The non-transitory computer-readable storage medium of claim 19, wherein the link state routing protocol is an open-shortest-path-first routing protocol.

21. The non-transitory computer-readable storage medium of claim 19, wherein the link state routing protocol is an intermediate-system-to-intermediate-system routing protocol.

22. The non-transitory computer-readable storage medium of claim 19, wherein the received link state information is processable by an algorithm of the link state routing protocol to determine the first routing information and wherein the second routing information is different from the first routing information.

23. The non-transitory computer-readable storage medium of claim 19, wherein determining how to route the received network traffic includes applying a Dijkstra algorithm to the changed link state information.

\* \* \* \* \*